(12) United States Patent
Oster

(10) Patent No.: US 7,545,320 B2
(45) Date of Patent: Jun. 9, 2009

(54) METHOD AND DEVICE FOR ACQUIRING SIGNALS IN A GLOBAL NAVIGATION SATELLITE SYSTEM

(75) Inventor: Yann Oster, Toulouse (FR)

(73) Assignee: Alcatel, Paris (FR)

( * ) Notice: Subject to any disclaimer, the term of this patent is extended or adjusted under 35 U.S.C. 154(b) by 87 days.

(21) Appl. No.: 11/447,248

(22) Filed: Jun. 6, 2006

(65) Prior Publication Data

US 2006/0279457 A1 Dec. 14, 2006

(30) Foreign Application Priority Data

Jun. 7, 2005 (FR) .................................. 05 51526

(51) Int. Cl.
*G01S 1/00* (2006.01)
(52) U.S. Cl. ................................. 342/357.15
(58) Field of Classification Search ................................
342/357.01–357.17
See application file for complete search history.

(56) References Cited

U.S. PATENT DOCUMENTS

| 5,844,521 | A | * | 12/1998 | Stephens et al. | ......... | 342/357.1 |
| 6,188,351 | B1 | * | 2/2001 | Bloebaum | ............... | 342/357.15 |
| 2001/0021195 | A1 | | 9/2001 | Miller et al. | | |
| 2002/0003495 | A1 | | 1/2002 | Johnstone et al. | | |
| 2004/0023678 | A1 | * | 2/2004 | Fredriksson | ................. | 455/502 |
| 2004/0192331 | A1 | * | 9/2004 | Gorday et al. | ............ | 455/456.1 |
| 2005/0149443 | A1 | * | 7/2005 | Torvinen | ..................... | 705/51 |

FOREIGN PATENT DOCUMENTS

EP 0 936 766 8/1999

\* cited by examiner

*Primary Examiner*—Thomas H Tarcza
*Assistant Examiner*—Nga X Nguyen
(74) *Attorney, Agent, or Firm*—Sughrue Mion, PLLC

(57) ABSTRACT

A method is disclosed for acquisition by navigation terminals of navigation signals broadcast by satellites of a global navigation satellite system (GNSS). A communication channel enables nearby terminals to exchange information and to constitute a network to provide assistance and to enable terminals to collaborate by sharing their respective resources and contributing to the computing operations involved in the execution of an acquisition phase for tuning to the navigation signal from a satellite in view. The method can be applied to any global navigation satellite system.

18 Claims, 1 Drawing Sheet

METHOD AND DEVICE FOR ACQUIRING SIGNALS IN A GLOBAL NAVIGATION SATELLITE SYSTEM

CROSS-REFERENCE TO RELATED APPLICATIONS

This application is based on French Patent Application No. 0551526 filed Jul. 06, 2005, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of acquiring signals in a global navigation satellite system (GNSS).

2. Description of the Prior Art

In a global navigation satellite system such as the Global Positioning System (GPS), each satellite of a constellation of satellites broadcasts a signal carrying time and date information that is very accurate because it is obtained from an atomic clock on board the satellite. This signal is referred to hereinafter as a navigation signal. A navigation signal is the result of modulating a carrier by a pseudorandom spreading code and where applicable by a navigation message. The spreading code is used to distinguish between different navigation signals.

The receiver of a navigation terminal must acquire the navigation signals from at least three satellites in order to determine its position in three dimensions in a global system of absolute coordinates.

If it does not know the universal time accurately, the receiver of a navigation terminal must acquire a fourth navigation signal.

In practice, complex computations using the information carried by the acquired signals enables the terminal to determine its position and therefore to address the location problem.

This is not the problem that the present invention seeks to solve, which is that of acquiring the signal transmitted by a satellite in view.

In a preliminary phase preceding the location process as such, a terminal acquires navigation signals broadcast by the satellites in order to be able to perform the computations of the location process using those signals. The invention relates to this preliminary phase, which is called the navigation signal acquisition phase and also involves computations.

The present invention relates to the acquisition of the GNSS signals transmitted by the satellites by a receiver terminal called a navigation terminal.

Acquisition of the GNSS signals entails time and frequency scanning to correlate the received signal with a replica of the required signal over a particular time period that is a function of the signal to noise (S/N) ratio. A low S/N ratio necessitates a longer correlation time, which induces a higher frequency step resolution, and thus a greater number of frequencies to be scanned for the same Doppler dynamic range (the Doppler phenomenon is linked to the movement of the satellite and/or the terminal).

However, the correlation time is still limited by the accuracy of the frequency reference of the terminal.

The carrier frequency and the phase of the spreading code relative to a frequency and time reference are referred to hereinafter as navigation signal tuning parameters.

The main problem for a navigation terminal in acquiring navigation signals is the number of processing operations to be carried out, which is in inverse proportion to the signal to noise ratio.

A first prior art solution to this problem increases the number of correlators operating in parallel in each terminal. The drawbacks of this solution are the increased logical complexity of the electronic circuits and the increased dissipation of the receiver.

A second prior art solution uses a base station to provide the terminal with assistance by communicating to the terminal the identities of the satellites that are visible and the tuning parameters for the navigation signals associated with those satellites.

The time/frequency reference of the base station must be broadcast to the terminals to enable them to use the assistance information. The base station and the terminals communicate to enable the transmission of assistance information and time/frequency synchronization information over a radio-frequency (RF) link provided by a cellular or other connection.

The drawback of the second solution is the sensitivity of the radio-frequency link to interference, in particular when transmitting the time/frequency reference. Also, a link of this kind necessitates a particularly wide bandwidth for transmitting accurate time-frequency synchronization (of the order of 100 MHz for time synchronization to within a few tens of nanoseconds).

Moreover, the base station providing the assistance must first acquire navigation signals from the satellites in view, even though it is as sensitive to interference as the terminals that it is assisting.

The acquisition of navigation signals when the signal to noise ratio is low and within an acceptable time period (of the order of a few tens of seconds) therefore remains a problem. The acquisition phase represents a large processing load that is in inverse proportion to the signal to noise ratio.

Thus no prior art solution achieves satisfactory navigation signal acquisition performance (in terms of acquisition time, probability of non-acquisition, probability of false acquisition, required computation power) if the signal to noise ratio is low.

The problem addressed by the present invention is that of improving the performance of the navigation signal acquisition phase regardless of the signal to noise ratio and without increasing the computation power of the navigation terminals.

The invention solves this problem by constructing a network of nearby terminals communicating via a radio-frequency link channel to collaborate for the purpose of effecting the computations implementing the acquisition phase.

The terminals are "nearby" if they are spaced by a few wavelengths of the modulation by the spreading code, defined as the "chip" length. For example, in the GPS the chip length for a modulation frequency of 1.023 MHz is 300 m.

Compared to existing methods, this solution achieves the required sensitivity without increasing the duration of the acquisition phase, as well as robustness to interference and fast acquisition.

This solution also provides local and autonomous assistance for tuning an incoming terminal entering the network to navigation signals to which the network has already been tuned.

Reciprocally, the network can inherit tuning parameters that have already been acquired by an incoming terminal entering the network.

SUMMARY OF THE INVENTION

The present invention more particularly consists in a method of acquisition by navigation terminals of navigation signals broadcast by satellites of a global navigation satellite system (GNSS), said method comprising:

communication of information via a communication channel between a plurality of nearby terminals having time and frequency synchronization forming a common reference, the terminals therefore forming a synchronized network; and collaboration between terminals of the resulting network to determine tuning parameters of the navigation signal from each satellite in view relative to the common time and frequency reference, said collaboration including:

managing sharing of their respective resources so that each contributes to the computations involved in determining the navigation signal tuning parameters; and transmitting the navigation signal tuning parameter results obtained over the communication channel in order for the terminals of the network to tune to the signal from the satellite in view.

Managing resource sharing includes allocating one or more scanning tasks as a function of the resources of each terminal.

Allocating scanning tasks includes sharing a global time and frequency scanning space.

Sharing said global time and frequency scanning space includes overlapping ranges.

Sharing said frequency scanning space includes dividing into subsets a range of frequencies in which the navigation signal from a satellite in view is liable to be received.

Sharing said time scanning space includes dividing into subsets a time range in which the phase relative to a time reference of the spreading code modulating the carrier transmitted by a satellite in view is liable to be found.

In one embodiment, resource sharing is advantageously managed by a master terminal adapted to divide and to distribute the processing involved in the execution of a navigation signal acquisition phase optimally between all the available computation resources; transmission over the communication channel advantageously includes transmitting results of partial processing by the terminals of the network in order for the master terminal of the network to determine the navigation signal tuning parameters; and transmission over the communication channel advantageously includes transmitting navigation signal tuning parameters from the master terminal to the other terminals of the network to assist in tuning all the terminals to the satellite in view.

In a variant of that embodiment, managing resource sharing involves a main master terminal and one or more secondary master terminals adapted to be substituted for the main master terminal in the event of unavailability of the main master terminal.

The communication of information further includes the communication of assistance information such as identification of the satellites in view, the tuning signals (i.e. the frequency and the code phase) of the satellites in view and, if a navigation message has been used, said navigation message.

The communication of information also includes managing the entry of a terminal to the network and its exit therefrom and evaluating its proximity and the assistance is assistance from the network to an incoming terminal or assistance to the network from an incoming terminal.

The assistance may include communication of the navigation message to the network by a remote base station.

In a variant of the method, the communication of information includes a relay service enabling point-to-point routing of information between remote terminals of the network via terminals of the network that then additionally provide a transmission relay function.

The time synchronization of the terminals may use an absolute or relative time reference.

The invention also provides a satellite navigation terminal adapted to use a global navigation satellite system (GNSS) and comprising:

a transceiver enabling it to communicate via a communication channel with a network consisting of other nearby terminals to transmit information enabling said terminals to collaborate to acquire a navigation signal transmitted by any satellite in view;

a time/frequency reference for time and frequency synchronization with the other terminals of the network;

a computation module adapted to execute one or more acquisition phase tasks to acquire a navigation signal from a satellite in view;

a management module for managing communicated information to control the computation module to define the task or tasks to be executed in accordance with information communicated by the terminals of the network.

The transceiver is further adapted to send or receive assistance information.

The management module may have a transmission relay function for the resulting network.

The time/frequency reference may be provided by a miniaturized atomic clock.

The invention further provides a network of satellite navigation terminals adapted to use a global navigation satellite system (GNSS) and to execute the above method for acquiring navigation signals from any satellite in view, said network comprising a plurality of the terminals described above.

Other features and advantages of the invention will become clearly apparent on reading the following description, which is given by way of illustrative and nonlimiting example and with reference to the appended drawing.

DETAILED DESCRIPTION OF THE PREFERRED EMBODIMENT

As emerges hereinafter, the acquisition method of the invention increases acquisition performance by constructing a network of terminals and sharing their resources, combined with bidirectional assistance (from the network to an incoming terminal entering the network or to the network from an incoming terminal entering the network) simplifying acquisition in certain circumstances. Assistance is also provided by a base station in the event of very low signal to noise ratios.

The method is implemented by a network of synchronized navigation terminals described hereinafter.

Figure 1:
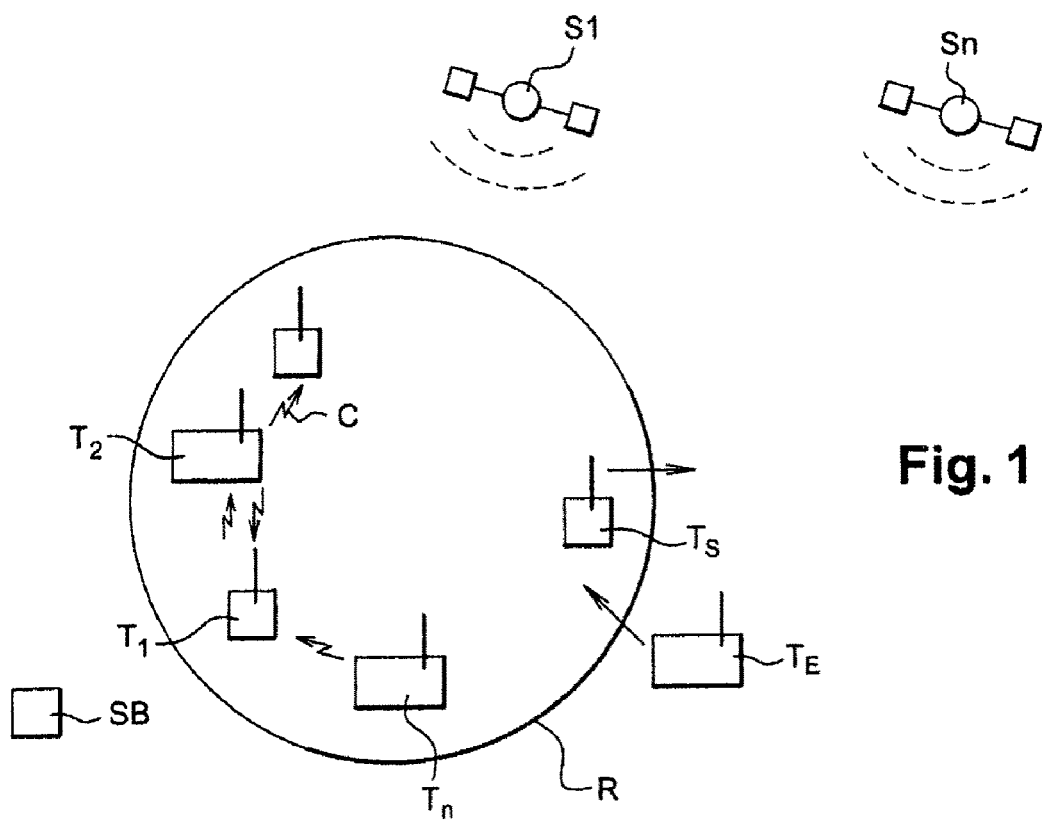
FIG. 1 is a diagram of a network of terminals adapted to implement the acquisition method of the invention.

The navigation terminals T1 to Tn shown in FIG. 1 represent nearby terminals forming a network R in the sense of the present invention. The network R is formed by a plurality of terminals that are synchronized in time and in frequency and able to communicate information over a radio-frequency link constituting a communication channel C.

The terminal TE represents an incoming terminal entering the network and the terminal TS represents an outgoing terminal leaving the network. A satellite S1 of a global navigation satellite system is in view from the network R but the satellite Sn is not yet in view.

Figure 2:
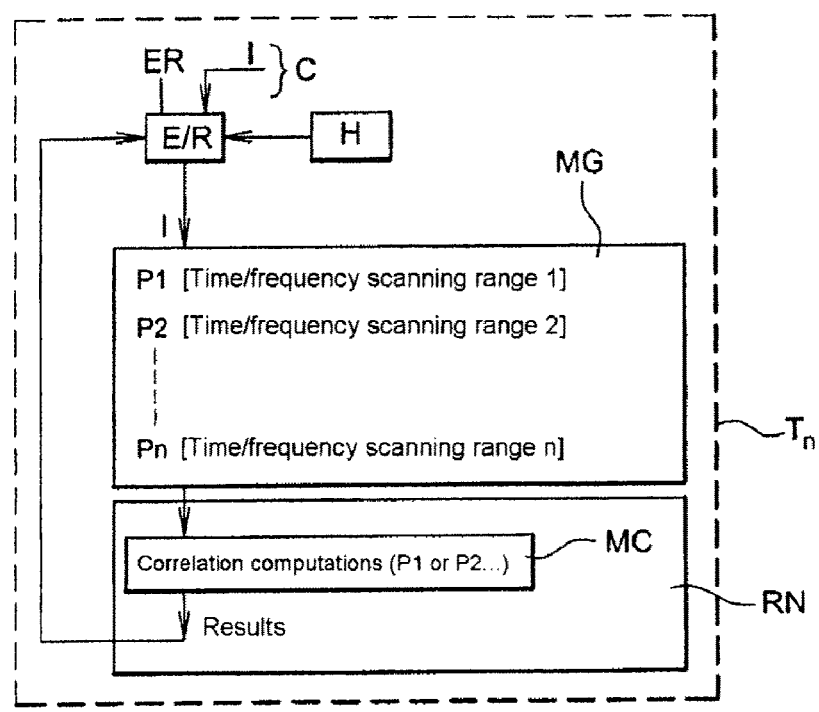
FIG. 2 is a diagram of a terminal of the invention.

Refer now to the FIG. 2 diagram of a navigation terminal Tn.

Each terminal T1 to Tn represented in FIG. 1 is based on the FIG. 2 diagram.

Thus each terminal is equipped with a transceiver E/R enabling it to communicate within the network and an ultrastable time/frequency reference H, for example a miniaturized atomic clock.

Each terminal also has a radio navigation device RN including in particular a correlation computation module MC that is able to execute the standard correlation computations involved in acquiring a navigation signal from a satellite in view. However, according to the invention, the module MC of each terminal does not perform all of the computations, which are divided between the terminals of the network, as explained hereinafter.

The radio navigation terminal RN is conventional and is therefore not described in detail here. According to the invention, the terminal additionally includes a management module MG for managing information I communicated over the network via the communication channel C.

Communication between the terminals enables transmission of assistance information and information I concerning the availability of resources of each terminal of the network.

The management module MG uses the information received by its terminal to control the computation module MC for the purposes of collaboration between terminals by sharing computation resources to implement the phase for acquiring a signal transmitted by a satellite in view.

Resource sharing is reflected in a sharing of computation tasks covering the global time and frequency scanning space.

The computations may be divided into n tasks P1 to Pn each corresponding to a time/frequency scanning range, for example. A terminal with large computation resources may be made responsible for a plurality of processing tasks. Two scanning ranges that are contiguous in time or in frequency share an overlap region in order to allow for uncertainties as to the time/frequency synchronization of the terminals and for the effect of the distance between the terminals on the estimated relative phase of the spreading code.

A frequency scanning range corresponds to a subset of the range of frequencies Fmin-Fmax in which the carrier of the navigation signal is liable to be received, allowing for the Doppler effect.

A time scanning range corresponds to the division into subsets of a time period in which the phase of the spreading code of the received navigation signal relative to the time reference modulo the period of the spreading code is liable to be found.

In one practical embodiment, one of the terminals of the network constituted in the above manner becomes the master terminal. In this case, its management module MG decides on the allocation of tasks to each terminal as a function of information received.

The master terminal preferably manages the resources of the respective terminals of the network in a coordinated manner that divides and distributes the processing operations involved in executing a navigation signal acquisition phase optimally between all the available computation resources.

The terminals of the network transmit partial processing results over the communication channel for the network master terminal to determine the navigation signal tuning parameters. The master terminal is then able to transmit the navigation signal tuning parameters over the communication channel to the other terminals of the network in order to assist in tuning all the terminals to the satellite in view.

A different embodiment uses a main master terminal and one or more secondary master terminals. In this case, the secondary master terminal(s) perform redundantly the operations performed by the master terminal (resource allocation and choice of tuning parameters) in order to monitor the master terminal and to be able to take over from it if it should become unavailable (by failing or leaving the network).

The master terminal for the synchronized network may be chosen by arbitration between the terminals, which communicate for this purpose over the communication channel.

In another embodiment resources may be allocated after a plurality of exchanges of information to coordinate the terminals, each of which assumes responsibility for one or more tasks without knowing the availability of each of the others.

Time synchronization of the terminals of the network may be achieved in two ways, depending on the time reference used. The time reference may be absolute or relative.

In the case of an absolute time reference, the terminals have access to the universal time reference.

In the case of a relative time reference, the terminals each have a local time reference synchronized by sending a pulse (for example over an RF link).

In practical terms, operation is as follows:
If the terminals of the network, and consequently the network itself, are not tuned to the satellite in view, the operations performed by the terminals are coordinated to distribute the processing operations necessary for acquiring the navigation signal with overlapping scanning ranges.
The correlation results are then broadcast over the communication channel together with the conclusions of the acquisition phase in respect of that navigation signal.
All of the terminals of the network use these tuning parameters to finalize tuning to the navigation signal.
The network is then tuned to the satellite in view.
The above steps are repeated for each new satellite in view.
When a terminal enters a network tuned to the satellites in view, it has the benefit of the assistance provided by the network, which consists of identification, code phase and frequency assistance for the satellites in view. For the incoming terminal, acquisition is then extremely fast as only a few time/frequency values have to be scanned around the values obtained as a result of the assistance provided by the network, given its proximity to the other terminals of the network and the accuracy of time/frequency tuning.
Reciprocally, a network that has been constructed in the manner described above can benefit from tuning parameters estimated beforehand by an incoming terminal for satellites to which the network is not yet tuned. In this case, it is the network that benefits from assistance provided by an incoming terminal.

In a different embodiment of the method for use in the event of S/N ratios that are very low (for example less than 35 dBHz), the coherent correlation time may be extended beyond the symbol period of the modulation by the navigation message (which is 20 ms in the case of the GPS) by having a remote station SB for which there is a good S/N ratio (for example of the order of 50 dBHz) communicate navigation messages received from the satellites. In this case, the terminals must have a buffer for storing the received signal samples in order to eliminate the modulation by the navigation message off-line.

The navigation message bit transition times are then known to within a fraction of a millisecond, according to the distance from the reference station. The terminals of the network can then extend the coherent correlation time over more than a bit time of the navigation message (which is 20 ms in the case of the GPS), complying with guard times around the transition times to allow for uncertainties as to the time synchronization and the distance between the base station and the terminals.

Accordingly, in this embodiment, the remote base station SB, which also has very accurate time synchronization, supplies assistance to the network by communicating the navigation message, i.e. the second signal by which the carrier is modulated. The terminals can then subtract that signal from the received signal and perform coherent integration over more than a symbol period of the modulation by the navigation message.

This embodiment eliminates the bit time limit, and the integration period can then be greater than 20 ms in the case of the GPS.

In a different embodiment of the method, the terminals may further have a transmission relay function in order to push back the transmission channel range limits. Thus a relay service is instituted to provide point-to-point routing when two terminals of the network are too far apart.

The use in the terminals of ultrastable time/frequency references (such as atomic clocks) significantly increases the correlation time compared to a standard GNSS receiver.

Moreover, because the computation load is shared between a plurality of terminals, the method of the invention reduces the acquisition time, increases the correlation time, and therefore increases the sensitivity, without directly increasing the computation capacity at the terminal level.

The method of the invention also achieves robustness to interference, fast acquisition and a reduction (from 4 to 3) in the number of satellites needed to perform the location, i.e. to determine the point when the time reference used for time synchronization is an absolute reference.

It therefore improves the accuracy with which the point is determined, the time reference being very well known.

There is claimed:

1. A method of acquisition by navigation terminals of navigation signals broadcast by satellites of a global navigation satellite system (GNSS), said method comprising:
   communication of information via a communication channel between a plurality of nearby terminals synchronized in time and frequency and thus forming a synchronized network; and
   collaboration between terminals of the network to determine tuning parameters of the navigation signal from each satellite in view relative to their common time and frequency reference, said collaboration including:
      managing sharing of their respective resources so that each contributes to computations for determining said navigation signal tuning parameters; and
      transmitting the navigation signal tuning parameter results obtained over the communication channel in order for the terminals of the network to tune to the signal from the satellite in view.

2. An acquisition method according to claim 1, wherein managing resource sharing includes allocating one or more scanning tasks as a function of the resources of each terminal.

3. An acquisition method according to claim 2, wherein allocating scanning tasks includes sharing a global time and frequency scanning space.

4. An acquisition method according to claim 3, wherein sharing said global time and frequency scanning space includes overlapping ranges.

5. An acquisition method according to claim 3, wherein sharing said frequency scanning space includes dividing into subsets a range of frequencies in which the navigation signal from a satellite in view is liable to be received.

6. An acquisition method according to claim 3, wherein sharing said time scanning space includes dividing into subsets a time range in which the phase relative to a time reference of the spreading code modulating the carrier transmitted by a satellite in view is liable to be found.

7. An acquisition method according to claim 1, wherein:
   resource sharing is managed by one of the terminals designates as a master terminal adapted to divide and to distribute the processing involved in the execution of a navigation signal acquisition phase optimally between all the available computation resources;
   transmission over the communication channel includes transmitting results of partial processing by the terminals of the network in order for the master terminal of the network to determine the navigation signal tuning parameters; and
   transmission over the communication channel includes transmitting navigation signal tuning parameters from the master terminal to the other terminals of the network to assist in tuning all the terminals to the satellite in view.

8. An acquisition method according to claim 7, wherein managing resource sharing involves a main master terminal and at least one secondary master terminals adapted to be substituted for the main master terminal in the event of unavailability of the main master terminal.

9. An acquisition method according to claim 1, wherein said communication of information further includes the communication of assistance information, said assistance information includes: identification of the satellites in view, the tuning signals of the satellites in view, and said navigation message, if a navigation message has been used.

10. An acquisition method according to claim 1, wherein said communication of information includes managing the entry of a terminal to the network and its exit therefrom and evaluating its proximity and the assistance is assistance from the network to an incoming terminal or assistance to the network from an incoming terminal.

11. An acquisition method according to claim 9, wherein the assistance includes communication of the navigation message to the network by a remote base station.

12. An acquisition method according to claim 1, wherein said communication of information includes a relay service enabling point-to-point routing of information between remote terminals of the network via terminals of the network that then additionally provide a transmission relay function.

13. An acquisition method according to claim 1, wherein the time synchronization of the terminals may be absolute or relative.

14. A satellite navigation terminal adapted to use a global navigation satellite system (GNSS) and comprising:
   a transceiver enabling it to communicate via a communication channel with a network consisting of other nearby terminals to transmit information enabling said terminals to collaborate to acquire a navigation signal transmitted by any satellite in view;
   a time/frequency reference for time and frequency synchronization with the other terminals of said network;
   a computation module adapted to execute one or more acquisition phase tasks to acquire a navigation signal from a satellite in view;
   a management module for managing communicated information to control the computation module to define the task or tasks to be executed in accordance with information communicated by the terminals of the network.

15. A navigation terminal according to claim 14, wherein the transceiver is adapted to send or receive assistance information.

16. A navigation terminal according to claim 14, wherein the management module has a transmission relay function for the resulting network.

17. A satellite navigation terminal according to claim 14, wherein the time/frequency reference is provided by a miniaturized atomic clock.

18. A network of satellite navigation terminals adapted to use a global navigation satellite system (GNSS) and to execute the method according to a method of acquisition by navigation terminals of navigation signals broadcast by satellites of a global navigation satellite system (GNSS), said method comprising:

communication of information via a communication channel between a plurality of nearby terminals synchronized in time and frequency and thus forming a synchronized network; and collaboration between terminals of the network to determine tuning parameters of the navigation signal from each satellite in view relative to their common time and frequency reference, said collaboration including:

managing sharing of their respective resources so that each contributes to computations for determining said navigation signal tuning parameters; and transmitting the navigation signal tuning parameter results obtained over the communication channel in order for the terminals of the network to tune to the signal from the satellite in view for acquiring navigation signals from any satellite in view.

\* \* \* \* \*